No. 876,597. PATENTED JAN. 14, 1908.
F. A. SEIBERLING.
VEHICLE TIRE.
APPLICATION FILED MAY 2, 1906.

Witnesses
Edna Bortz
Glenara Pot

Inventor,
F. A. Seiberling,
by C. E. Humphrey,
Atty.

UNITED STATES PATENT OFFICE.

FRANK A. SEIBERLING, OF AKRON, OHIO.

VEHICLE-TIRE.

No. 876,597.

Specification of Letters Patent.

Patented Jan. 14, 1908.

Application filed May 2, 1906. Serial No. 314,864.

*To all whom it may concern:*

Be it known that I, FRANK A. SEIBERLING, a citizen of the United States, residing at Akron, in the county of Summit and State of Ohio, have invented new and useful Improvements in Vehicle-Tires, of which the following is a specification.

This invention relates to elastic vehicle tires, and the object thereof in its broadest sense is to obtain from a solid tire as near as possible the resiliency and elasticity obtainable from a tire of the pneumatic type, without the dangers of puncture incident to the use of the latter kind.

The invention further and more specifically aims to construct a solid tire which has an increased resiliency and requires less material to construct than the ordinary solid tire.

With the foregoing and other objects in view, the invention consists in the novel construction constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
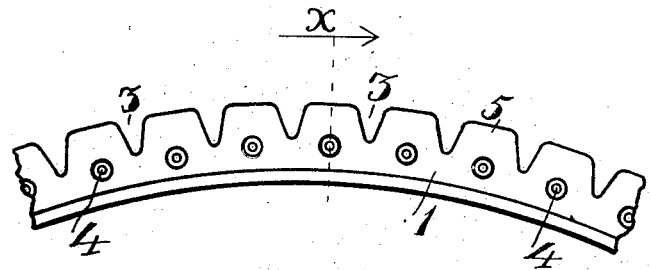
Figure 2:
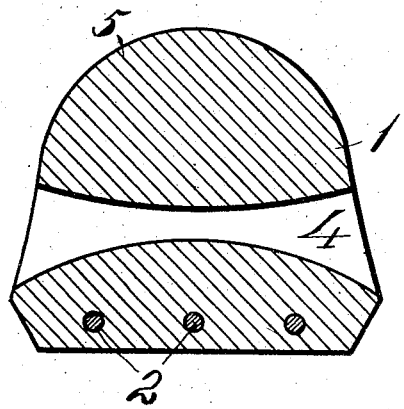

In the drawings, in which similar reference numerals indicate like parts in the different figures: Figure 1 is a side elevation of my improved tire; and, Fig. 2 is a transverse section of the same on line $x$ of Fig. 1.

In constructing my improved tire, any cross-sectional configuration may be imparted thereto which will meet the desires or fancies of the maker or user; and while I have illustrated a tire of the type known as the "A. W. Grant" tire, my invention is equally applicable to other forms of solid tires. These tires are preferably constructed of vulcanized rubber, and the tire illustrated in the drawings consists of a flat base with upwardly and outwardly-diverging sides from which extend upwardly and inwardly converging portions formed upon curvilinear lines and terminating in a rounded tread. The body portion of this tire is designated in the drawings by the reference numeral 1, and this tire is retained upon its seat in the rim of a wheel by means of circumferentially-arranged retaining wires or bands 2, 2; although any other type of fastening or holding device may be employed which will be appropriate to the type of tire in which my invention is used.

In carrying into effect my invention, the tread portion of the tire is provided at intervals with transversely-arranged notches or grooves, designated in the drawings by the reference numerals 3, 3, and the placing of these grooves in the tire serves to divide the same into a series of outwardly-tapering pyramidically-truncated members 5, 5. The existence of these transverse notches 3, 3, in the main body portion of the tire enables the portions which exist between the notches to be compressed more easily and to yield to a greater extent under a given amount of compression than would be possible were the tread portion continuous instead of being interrupted by these notches. From the fact that these members 5, 5, yield more easily to a definite amount of compression the tire's cushioning qualities and resiliency are greatly increased, this being due to the fact that the rubber which is displaced by the compression of the tread portion is permitted to expand in a longitudinal or circumferential direction, as well as transversely; whereas, in the ordinary type of tire with an uninterrupted tread, comparatively the only possible direction in which the expansion can take place is laterally. The existence of these notches in the tread portion of the tire also serves to assist in obtaining a more perfect traction or adhesion to the surface on which the tire is being used, thus to a large extent eliminating the danger of skidding, which is a result greatly sought after by users of this type of device. In order to further reduce the amount of material necessary to construct the same and to increase the resiliency and cushioning qualities thereof, I locate at intervals throughout the tire body a plurality of preferably unobstructed openings 4, arranged transversely of the body of the tire and preferably placed on the medial line between the notches 3, 3, thereby decreasing the amount of rubber contained in the members 5. In forming these openings 4, 4, I prefer to make them of such a design that they will be self-cleaning; by this is meant that if for any reason dirt or similar substances become lodged therein, the compression due to the use of the tire will cause the walls surrounding these openings to squeeze out the accumulations therein. In order to effect successfully this latter function, these openings are made with a greater external diameter than the diameter of their transverse medial portion. The exact conformation of these openings will necessarily be subject to some variation, due to the requirements of each particular case, as they may be constructed in the form of frusto conically-formed openings with their smaller ends along the transverse medial line of the tire, or upon lines resembling the construction of the medial portions of an hour glass; and further it will be stated that the amount of inclination which is given to these openings on the side thereof which is nearest the base portion of the tire may be greater than that given to the sides of the openings which adjoin the tread portion, in order to make the function of self-cleaning more perfect. It will be further stated that it is entirely within the scope of this invention to locate the openings 4 in the sides of the tire body 1 oppositely-disposed with respect to each other and with the smaller ends thereof adjacent the medial line of the tire and of such a depth that there will intervene between the inner narrower ends of these openings a septum, preferably constructed of the material of which the tire body is composed, whereby instead of one continuous opening extending therethrough, as illustrated in the drawings, the openings will be independent of each other although preferably with their axes in alinement; but irrespective of the exact formation of these openings they will be comparatively self-cleaning and add increased resiliency to the tire.

What I claim and desire to secure by Letters Patent, is:—

An elastic vehicle tire having the tread thereof provided with a circumferentially-extending series of transverse notches suitably spaced apart, said notches extending partially through the tire, said tire further provided with a circumferential series of transversely-extending openings, said openings being uninterrupted and having flaring ends, and a contracted intermediate portion.

In testimony whereof I have hereunto set my hand in the presence of two subscribing witnesses.

FRANK A. SEIBERLING.

Witnesses:
C. E. HUMPHREY,
GLENARA FOX.